Figure 1:
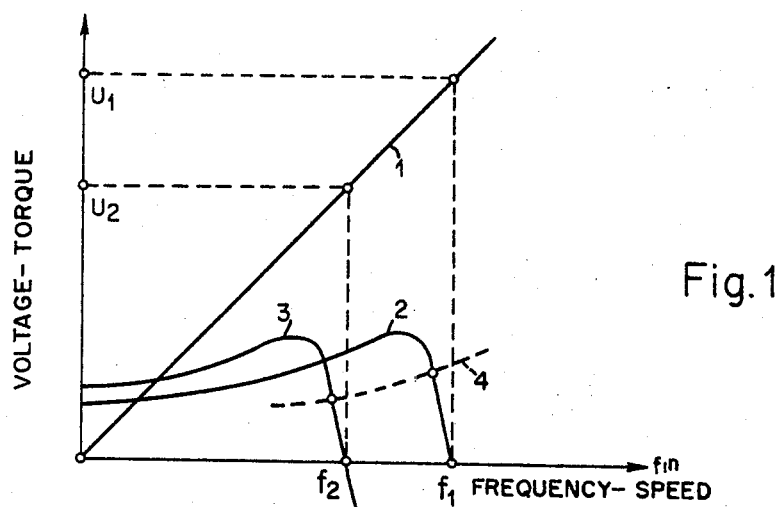

United States Patent
Jensen

[15] 3,670,224
[45] June 13, 1972

[54] SPEED AND VOLTAGE CONTROL MEANS FOR AN ALTERNATING-CURRENT MOTOR, PARTICULARLY A POLYPHASE INDUCTION MOTOR

[72] Inventor: Arne Jensen, Nordborg, Denmark
[73] Assignee: Danfoss A/S, Nordborg, Denmark
[22] Filed: Feb. 18, 1971
[21] Appl. No.: 116,657

Related U.S. Application Data

[63] Continuation of Ser. No. 806,655, March 12, 1969, abandoned.

[52] U.S. Cl............................318/227, 318/230, 318/231, 318/345
[51] Int. Cl.............................................H02p 5/40
[58] Field of Search...............................318/227–231, 345

[56] References Cited

UNITED STATES PATENTS

| | | |
|---|---|---|
| 3,344,326 | 9/1967 | Risberg............................318/231 X |
| 3,500,158 | 3/1970 | Landau et al.........................318/227 |

Primary Examiner—Gene Z. Rubinson
Attorney—Wayne B. Easton

[57] ABSTRACT

The invention relates to a speed and voltage control system for an alternating current motor such as a polyphase induction motor. The system includes voltage and frequency regulators and an inverter. In order to avoid the damaging effects of reverse currents and excessive voltages due to hypersynchronous speed operation upon reducing motor speed, the direct current voltage is made the independent variable with the control frequency being dependent on the actual direct current voltage at the inverter.

2 Claims, 7 Drawing Figures

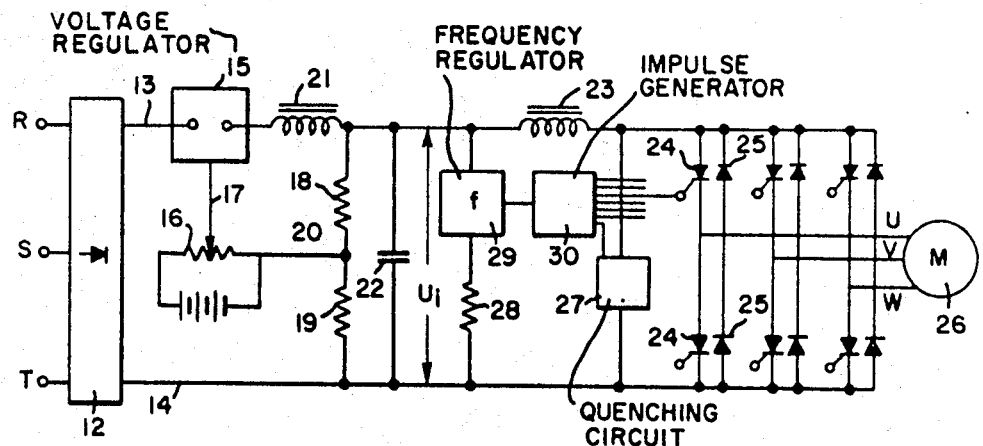
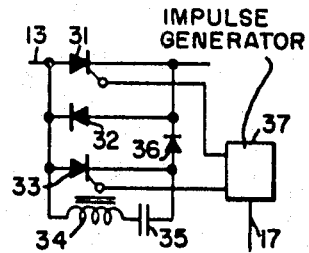
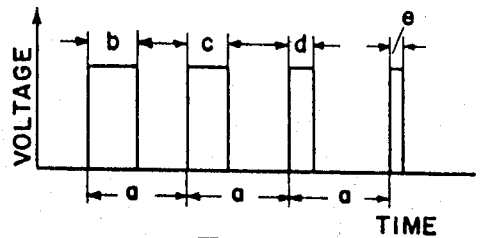
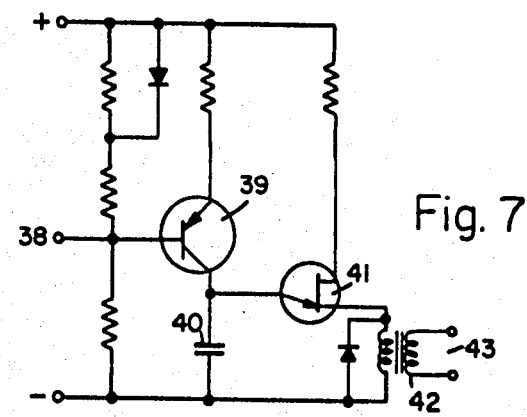

SPEED AND VOLTAGE CONTROL MEANS FOR AN ALTERNATING-CURRENT MOTOR, PARTICULARLY A POLYPHASE INDUCTION MOTOR

This is a continuation of Ser. No. 806,655, filed Mar. 12, 1969, and now abandoned.

The invention relates to a speed and voltage control means for an alternating-current motor, particularly a polyphase induction motor, in which means a regulable direct-current voltage is fed through an intermediate circuit containing at least one condenser to an inverter which comprises at least two branches having two controllable rectifiers arranged in series and free-running diodes associated therewith, the motor speed or the frequency of the control impulses sent to the inverter and the motor voltage being regulated in a predetermined relationship to each other.

In order to control the speed of the motor, the frequency of the voltage supplied to the motor or the frequency of the control impulses sent to the inverter is altered. Raising of the frequency, however, leads to an increase in the inductive resistance. In order to keep the magnetization of the motor at the corresponding level, it is therefore necessary to raise the voltage. Usually, provision is made for the voltage to follow the frequency in a linear manner.

Inverter switching arrangements are known wherein an alternating-current voltage is rectified, regulated as to value and finally smoothed by means of an intermediate circuit which consists of a series choke and a shunt condenser and then inverted again to AC. The free-running diodes are for the purpose of passing currents that still flow, after the controllable rectifiers have been cut out, due to the inductances present.

A disadvantage occurs, however, in control switching arrangements of this kind. If, for the purpose of reducing the motor speed, the frequency of the control impulses is reduced and, in dependence thereon, the voltage fed to the motor is also reduced, the motor does not immediately respond to this signal because of its mass inertia. Instead, its speed drops slowly. This means that it runs for a time at an hyper-synchronous speed—in relation to the newly adjusted frequency—and therefore operates as a generator. This generator therefore feeds a current, through the free-running diodes, into the intermediate circuit where it charges the condenser or condensers. Since the intermediate circuit has been regulated, with frequency, to a lower voltage, this current can assume very high values. The charging of the condenser leads to excess voltages. Both of these factors can have very harmful effects upon the components of the inverter or of the voltage supply system.

The object of the invention therefore is to provide a speed and voltage control means of the initially described kind, wherein the risk of reverse currents and excess voltages is considerably smaller.

According to the invention, this object is achieved by controlling the nominal value of the direct-current voltage as an independent variable and the frequency in dependence upon the actual value of the direct-current voltage at the condenser or the inverter.

By this procedure, the required speed is set with the help of the voltage. This does not involve any disadvantage in normal operation, since the actual value of the voltage follows the nominal voltage that has been set, and therefore the frequency, dependent upon the actual value, follows the setting for the nominal value of the voltage. On the other hand, considerable advantages are obtained if the nominal voltage value is reduced for the purpose of lowering the speed. Although the motor operates as a generator in this case too, the frequency of the control impulses, however, does not follow the nominal value setting, but remains linked to the actual value for voltage, which is largely determined by the generator voltage. Consequently, the generator—in relation to the frequency of the direct-current voltage fed to it—runs at a speed that is only slightly above the synchronous speed. Therefore, only very small currents flow and these can be accepted without difficulty by the condenser in the intermediate circuit. The speed of the electrical machine diminishes gradually on the basis of the internal losses and the losses in the connected consumer unit. The actual value for voltage (and thus the frequency) follows the fall in speed until the nominal voltage value that has been set is reached.

Theoretically, the disturbing increase in voltage due to the charging of the condenser in the intermediate circuit could also be eliminated by using a condenser of correspondingly great capacity. Such a condenser would, however, be large and costly. On the other hand, in a further form of the invention, the problem can be dealt with using very small and inexpensive condensers if the voltage is regulated in such a way that impulses, the width of which depends upon the nominal voltage value that has been set, are derived from a constant direct-current voltage by means of an electronic switch and are smoothed by means of the intermediate circuit, the impulse frequency being at least ten times, and preferably twenty times, as great as the mains frequency. Small condensers suffice for smoothing these impulses of relatively high frequency, which condensers would, however, lead to very high excess voltages at the inverter input point if the control relationship of the invention were not used.

An advantageous form of the frequency regulator is a switching arrangement wherein the voltage at the inverted converter controls a transistor, through which a condenser is charged, in dependence upon which the impulses are produced by a Unijunction sweep generator. In this way, a directly linear relationship between frequency and the actual voltage value is obtained.

Figure 2:
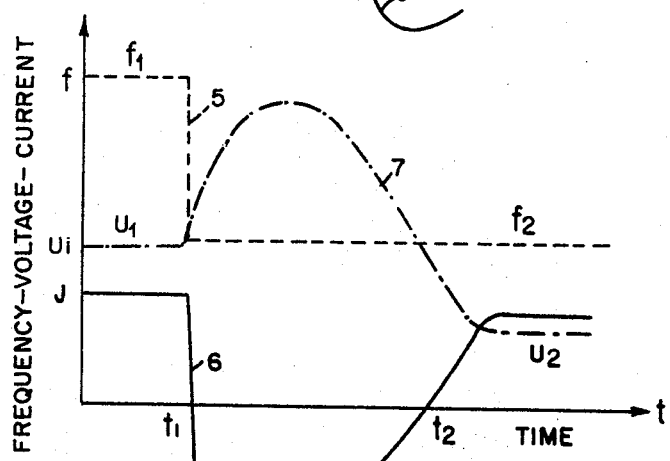
Figure 3:
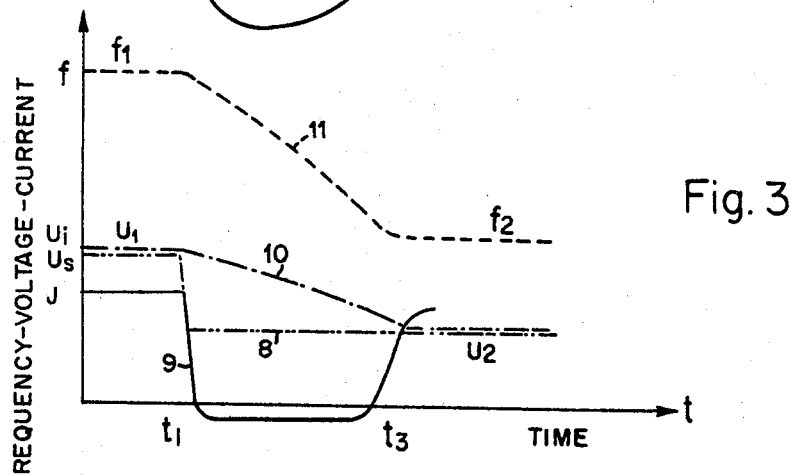

The invention will now be explained in more detail by reference to an embodiment described in the drawing, wherein:

FIG. 1 shows, in a graph, the relationship between voltage and frequency, and between torque and speed in the switching arrangements here considered, FIG. 2 shows frequency, voltage and current, plotted against time, in the known control switching means, FIG. 3 shows frequency, voltage and current plotted against time, in the case of the switching arrangement of the invention, FIG. 4 shows, in a schematic diagram, a form of arrangement of the switching means of the invention, FIG. 5 illustrates a form of construction of the electronic switch in the voltage regulator, FIG. 6 is a diagram illustrating the impulses passed by the electronic switch, and FIG. 7 shows an example of an arrangement for the frequency regulator.

In the graph seen in FIG. 1, the characteristic curve 1 shows the required linear relationship between the voltage U at the input of the inverted converter and the frequency f of the control impulses fed to the inverter. Curves 2 and 3 show the relationship between torque $Md$ and speed $n$ in the case of a driven asynchronous motor. For each individual speed, the working points are indicated by the point of intersection with a characteristic curve 4 dependent upon the consumer unit that it is required to power. If the frequency is regulated so that it drops from $f_1$ to $f_2$, the motor first continues to run at its initial speed. In relation to the frequency $f_2$, now provided, the motor therefore operates in hyper-synchronous range, i.e., as a generator, as shown by branch 3' of the curve.

FIG. 2 illustrates the course of the curves, with time, for such a change-over procedure. At the moment $t_1$, the frequency is reduced from $f_1$ to $f_2$ (curve 5). The current I here moves along the curve 6 into the generator range. The generator current charges the condenser in the intermediate circuit, so that the value $U_i$ for voltage at the input of the inverted converter rises in a pronounced manner, as indicated by curve 7, before it drops again to the value $U_2$ associated with the value $f_2$.

According to the invention, and as seen in FIG. 3, it is not the frequency but the nominal value $U_s$ that is displaced along the curve 8 from the voltage value of $U_1$ to $U_2$, at the moment $t_1$. Consequently, the motor current again moves along the curve 9 into the generator range, the generator current however, being considerably lower than in the case illustrated in FIG. 2, since the frequency of the control impulses for the inverter has held its initial value practically unchanged. This frequency is controlled by the actual voltage value $U_i$ at the input of the inverter, this value decreasing in the manner shown by curve 10 in correspondence with the reduction in speed of the electrical machine. Accordingly, there is a change in frequency along the curve 11. The required new condition is reached at the moment $t_3$. The time interval between $t_1$ and $t_3$ depends upon how rapidly the machine expends energy, i.e., upon its internal losses and those of the associated consumer unit.

FIG. 4 shows a switching arrangement wherein the phases R, S and T of a polyphase current mains feed a rectifier 12 at the two output leads 13 and 14 of which there is available a constant direct-current voltage. This is passed to a series voltage regulator 15 with which are associated a battery-fed adjusting resistor 16, with a tapping 17 for fixing the nominal value, and a voltage divider, connected at the output side thereof and comprising resistors 18 and 19, for tapping off the actual voltage value at the point 20. The main component of the voltage regulator 15 is an electronic switch which passes the constant direct-current voltage only incrementally in impulse form, as described in more detail below. On the output side of the voltage regulator is connected an intermediate circuit, which consists of a series choke 21 and a shunt condenser 22, these providing a smoothed mean value for voltage from the impulses passed by the electronic switch.

The actual voltage value $U_i$ at the output of this intermediate circuit is passed by way of a short-circuit impedance 23 to a three-phase inverter, which in the bridge arrangement 6 contains controllable rectifiers 24 and six free-running diodes 25 connected in antiparallel therewith. The three output leads U, V and W feed a three-phase asynchronous motor 26. The inverter also incorporates a common quenching circuit 27. The switching means for the inverter is to be understood as only being represented schematically. It may be of any known design, can use an individual instead of a common quenching system, can incorporate commutating condensers, etc.

The same voltage $U_i$ is applied to the series control arrangement comprising a resistor 28 and a frequency regulator 29. The latter sends impulses to a control device 30 which feeds the quenching circuit 27 with impulses of a frequency six times as great as that required in the three-phase supply system U, V and W and which supplies the controllable rectifiers 24 with striking impulses during the period in which they are to be conducting.

The voltage regulator 15 may have the switching arrangement illustrated in FIG. 5, for example. Contained in the lead 13 is a controllable rectifier 31. Connected in parallel with the latter are a diode 32, a controllable quenching rectifier 33 and the series arrangement comprising a recharging choke 34 and a commutating condenser 35. A further diode 36 is fitted between the quenching rectifier 33 and the diode 32. A control device 37 sends striking impulses to the two controllable rectifiers 31 and 33 in dependence upon the voltage supplied through the tapping 17. When the rectifier 31 is blocked, the condenser 35 becomes charged to the direct-current voltage made available by the rectifier 12. When the rectifier 31 receives a striking impulse, it becomes conducting. This condition is stable until a striking impulse is sent to the rectifier 33. As soon as the latter becomes conducting, the condenser 35 is recharged through the recharging choke 34 and produces an inverse voltage which acts by way of the rectifier 31 and blocks it. At the same time, the quenching rectifier 33 is also blocked. The condenser 35 can then be recharged again by way of the rectifiers 36 and 32 and, if required, recharged a little by the rectifier 12, so that it is ready for use again.

The control device 37 sends striking impulses at regular time intervals to the rectifier 31, so that the voltage impulses passed through the lead 13 are of predetermined frequency. The striking impulses 33, however, are sent, in dependence upon the required voltage, at different intervals $b, c, d$ and $e$ after the first-mentioned striking impulse, so that the voltage impulses passed through are of different widths, as shown in FIG. 6. The smoothing intermediate circuit 21, 22 is adapted to the repetition frequency of these impulses, e.g., 1000 cycles, so that a voltage representing the mean value of the impulses can be picked up at the output of the intermediate circuit. The control device 37 may be of the form described in U.S. patent application Ser. No. 792,684, filed Jan. 21, 1969, for example.

FIG. 7 shows a form of the frequency regulator 29. A voltage proportional to the actual voltage value $U_i$ is applied at the input 38. This voltage is passed to the base of the transistor 34 in the collector circuit of which is contained a condenser 40. This is charged at a rate that is directly proportional to the voltage at the input 38. The condenser voltage is applied to a Unijunction transistor 41, the base 1 of which is connected to the output 43 by way of a transformer 42, said output leading to the control device 30. As soon as the voltage at the condenser 40 has reached a prescribed threshhold value, the condenser discharges through the Unijunction transistor 41, the latter sending an impulse. The sequence of impulses at the output 43 is therefore proportional to the voltage at the input 38. The sequence of impulses is processed in the control device 30 in the manner required for controlling the inverter. An example of the form of the control device is disclosed in U.S. patent application Serial No. 792,685, filed January 21, 1969.

The circuit diagram of FIG. 4 clearly shows that the frequency is controlled by the actual value $U_i$ of the voltage at the input to the inverter. It is thus a dependent variable. The independent variable for varying the speed of the motor is the nominal value for voltage which is shifted with the help of the tapping 17.

It is, of course, not absolutely necessary for the frequency and the voltage to be in linear relationship with each other. Furthermore, it may be expedient in some cases to change the frequency not merely in dependence upon voltage but also in dependence upon the motor current.

I claim:

1. A speed and voltage control system for an alternating current motor such as a polyphase induction motor comprising, a voltage regulator, an inverter having inlet terminals connected to and supplied by said voltage regulator, said inverter having at least two branches with each branch having two controllable rectifiers arranged in series and two free running diodes in antiparallel relation to said rectifiers, a voltage to frequency converter having at least one condenser and having the frequency of the control output pulses thereof dependent upon the voltage at said condenser, said voltage to frequency converter being connected to said voltage regulator and said inverter with said condenser having voltage applied thereacross from said voltage regulator and from said inverter due to motor generator action, a line rectifier connected to said voltage regulator, and voltage setting means connected to said voltage regulator for producing selected nominal voltages, said voltage regulator having switch means for producing high frequency impulses of variable width in dependence on said nominal voltages.

2. A speed and voltage control system according to claim 1 in which said voltage to frequency converter includes resistor means connected to said condenser and being subject to the voltage at the inlet terminals of said converter, and a unijunction sweep generator connected to said resistor for controlling the charging of said condenser responsive to the voltage across said resistor.

* * * * *